United States Patent [19]

Hayashi

[11] 4,312,061
[45] Jan. 19, 1982

[54] RECORD PLAYER

[75] Inventor: Hideaki Hayashi, Mitaka, Japan

[73] Assignee: Nippon Columbia Kabushikikaisha, Tokyo, Japan

[21] Appl. No.: 48,894

[22] Filed: Jun. 15, 1979

[30] Foreign Application Priority Data

Jul. 6, 1978 [JP] Japan ............................ 53-82226
Jul. 6, 1978 [JP] Japan ............................ 53-82227
Aug. 31, 1978 [JP] Japan ........................... 53-106606
Oct. 5, 1978 [JP] Japan ......................... 53-137119[U]

[51] Int. Cl.³ .......................... G11B 3/10; G11B 3/08; G11B 17/06
[52] U.S. Cl. .................................. 369/216; 369/225; 369/228
[58] Field of Search ............ 274/9 RA, 23 R; 369/57, 369/216, 217, 224, 225, 226, 228

[56] References Cited

U.S. PATENT DOCUMENTS

4,121,836 10/1978 Cheeseboro ..................... 274/23 R
4,143,879 3/1979 Wren .................................. 274/23 R
4,184,688 1/1980 Omura ............................ 274/9 RA Primary Examiner—Steven L. Stephan

[57] ABSTRACT

A record player having a tone arm, a tone arm drive device in the horizontal and vertical directions, a detector detecting a rotary position of the tone arm and generating a voltage corresponding to the rotary position of the tone arm, and a circuit producing a voltage to set the tone arm at a desired position. In this case, a specific knob is provided in connection with the circuitry so as to move the tone arm to the desired position by operating the knob electrically.

12 Claims, 31 Drawing Figures

RECORD PLAYER

BACKGROUND OF THE INVENTION

1. Field of the Invention

The present invention relates generally to a record player, and is directed more particularly to a tone arm control apparatus of a record player by which a tone arm is electrically controlled by a knob operation to locate the tone arm at a desired position on a record disc, for example, a third program or music recorded on the record disc.

2. Description of the Prior Art

In the prior art, there is proposed a tone arm driving device of record player in which a driving means such as a driving motor is provided on the horizontal rotary shaft of the tone arm. With such the tone arm driving device, since the frictional force for a tone arm lifter and so on is changed due to variation of the stylus pressure of a cartridge, the speed of the tone arm becomes high or low as compared with a predetermined moving speed. Therefore, a gear or the like is employed to reduce the driving force of the motor to drive the tone arm horizontally. Due to the provision of the above element, vibrations are generated from the motor and gear so that when the movement of tone arm is stopped by a hand, a large force is generated in the horizontal rotary shaft and, as a result, the bearings and so on are damaged.

Further, due to the fact that the moving speed of the tone arm is constant, when a predetermined appointment position (where the stylus is to be initially located) is near the inner-most record groove of a record disc, the time period for the tone arm to move to the appointment position becomes long and hence it is considered very late that the tone arm arrives at the appointment position from its initial position.

In the prior art, it is also known that, in order to control the resonance of a pick-up caused by the distortion or deformation of a record disc, the tone arm is controlled electrically. A driving motor is provided on a weight. The weight serves to add a stylus pressure, while the motor automatically adjusts the stylus pressure and accordingly improves the property of the tone arm, and simplify the operational property.

In that case, a motor is required to drive the tone arm, which results in that the rotor of the motor is added to the tone arm. Therefore, the effective mass of the tone arm increases, and accordingly the construction becomes complicated, the size becomes large and the load for the vertical and horizontal bearings becomes great.

OBJECTS AND SUMMARY OF THE INVENTION

Accordingly, an object of the present invention is to provide a record player with a tone arm driving apparatus, by which a tone arm can be brought to the position of a desired program or music on a record disc i.e. appointment position by only operating an operational device.

Another object of the invention is to provide a tone arm driving apparatus for use with a record player, in which the difference between a tone arm position (angle) detecting output and a voltage serving as a position setting reference voltage is taken as a reference voltage and this reference voltage is compared with the voltage corresponding to the rotating speed of a tone arm to operate the tone arm.

A further object of the invention is to provide a tone arm driving apparatus, in which the rotor of a driving motor attached to the rotary shaft of a tone arm is made light in weight and hence the equivalent mass of the tone arm is reduced.

A further object of the invention is to provide a record player, in which when a user touches a knob, a tone arm operates.

A further object of the invention is to provide a tone arm driving apparatus for use with a record player, in which, during the time when the operating device of a setting device is operated upon lowering a tone arm, the tone arm automatically brought to a set position is not lowered, but when a user's hand is apart from the operating device, an arm lifter is operated to lower the tone arm.

A still further object of the invention is to provide a tone arm driving apparatus for use with a record player, in which in order to remove such a defect that when a user's hand is apart from a tone arm before the tone arm arrives at a set position, an arm lifter operates and hence the tone arm is lowered to start the playback of a music on a record disc other than the set position, after it is ascertained whether the tone arm is located on the set position or not, the lowering operation of the tone arm is carried out.

According to an aspect of the present invention there is provided a record player which comprises a tone arm, tone arm drive device for driving the tone arm in horizontal and vertical directions, a device for detecting a position of the tone arm and producing a voltage corresponding to the position of the tone arm, a circuit for producing a voltage to set the tone arm at a desired position, and a circuit for comparing the voltage from the detecting device with the voltage from the last-mentioned circuit to apply a difference voltage therebetween to the tone arm drive circuit.

The other objects, features and advantages of the present invention will become clear from the following description taken in conjunction with the accompanying drawings through which the like references designate the same elements.

DESCRIPTION OF THE PREFERRED EMBODIMENTS

The present invention will be hereinafter described with reference to the attached drawings.

Figures 1, 2A, 2B:
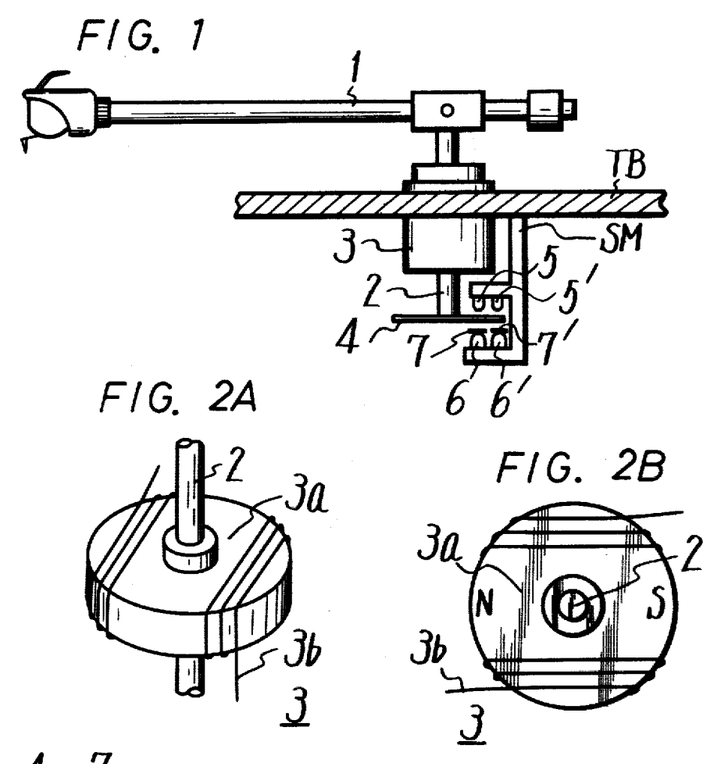
FIG. 1 is a schematic side view showing an example of the tone arm driving apparatus according to the present invention.
FIGS. 2A and 2B are a perspective view and a plan view showing the horizontal driving device used in the apparatus shown in FIG. 1.

FIG. 1 is a side view showing an example of the tone arm driving apparatus according to the present invention. In the example of the invention shown in FIG. 1, a tone arm 1 has a horizontal rotating shaft 2. A tone arm driving apparatus 3 in the horizontal plane (which will be hereinafter referred to as the drive device) is attached to the shaft 2. As shown in FIGS. 2A and 2B, the tone arm driving apparatus 3 consists of a rotor 3a and a winding or coil 3b. In this case, the rotor 3a is made of, for example, a disc magnet which is attached to the shaft 2, and the coil 3b is wound on the disc magnet or rotor 3a in parallel with the N-S pole direction thereof. When no current flows through the coil 3b, the tone arm 1 operates similar to an ordinary tone arm. However, when the coil 3b is supplied with current, a predetermined torque is generated about the horizontal rotating shaft 2 of tone arm 1. In this case, the torque varies sinusoidal in response to the rotating angle of tone arm 1. However, within an ordinary rotating angle range of tone arm 1, the torque can be selected substantially constant.

Turning back to FIG. 1, a rotary polarizing disc 4 is attached to the shaft 2 under the driving apparatus 3, while two pairs of luminous diodes 5, 5' and light receiving elements 6, 6' such as cadmium sulfide cells are mounted on a support member SM to grip the polarizing disc 4 therebetween. Between the light receiving elements 6, 6' and disc 4, provided are polarizing plates 7, 7'. The polarizing angles thereof are shifted by 90° relative to each other so that the lights from the luminous diodes 5, 5' to the receiving elements 6, 6' through the polarizing plates 7, 7' operate differentially in response to the rotation of tone arm 1.

Now, an example of the circuit of the invention for driving the apparatus shown in FIG. 1 will be described with reference to FIG. 3. As shown in the figure, the light receiving elements 6 and 6' are connected in series. The voltage appearing at a connection point a between the light receiving elements 6 and 6', whose resistance values changes differentially in response to the rotation of tone arm 1, changes linearly substantially in response to the rotation of tone arm 1. The voltage at the connection point a is differentiated by a differentiation circuit consisting of a capacitor C1 and a resistor R1 and then amplified by an amplifier A. Thus, the output signal delivered to its output terminal c corresponds to the rotating speed of tone arm 1. If a horizontal drive switch S, which is connected to an output terminal e of a differential amplifier B, is closed, the output signal at the output terminal e of differential amplifier B is fed through switch S to horizontal drive apparatus 3. When the voltage at an output terminal d of a comparison amplifier C, which will be described later, is fed to one input terminal of the differential amplifier B, the horizontal drive apparatus 3 is driven and hence the tone arm 1 is rotated. In this case, since the voltage corresponding to the rotating speed of tone arm 1 is applied from the amplifier A to the other input terminal of differential amplifier B, the rotating speed of tone arm 1 is made constant by the cooperation of both the voltages applied to differential amplifier B. In this case, the rotating speed of tone arm 1 is changed in response to the voltage at the output terminal d of amplifier C, and when the voltage of terminal d is inverse in polarity, the tone arm 1 is rotated in the opposite direction. Further, when the voltage at terminal d is zero, the tone arm 1 stops its rotation. In the above cases, the speed control is always carried out for the rotation of tone arm 1 so that even if the frictional resistance and so on change, the tone arm 1 is rotated substantially constant. Further, even in the case where the voltage at the terminal d is zero, the tone arm 1 is damped.

Figure 3:
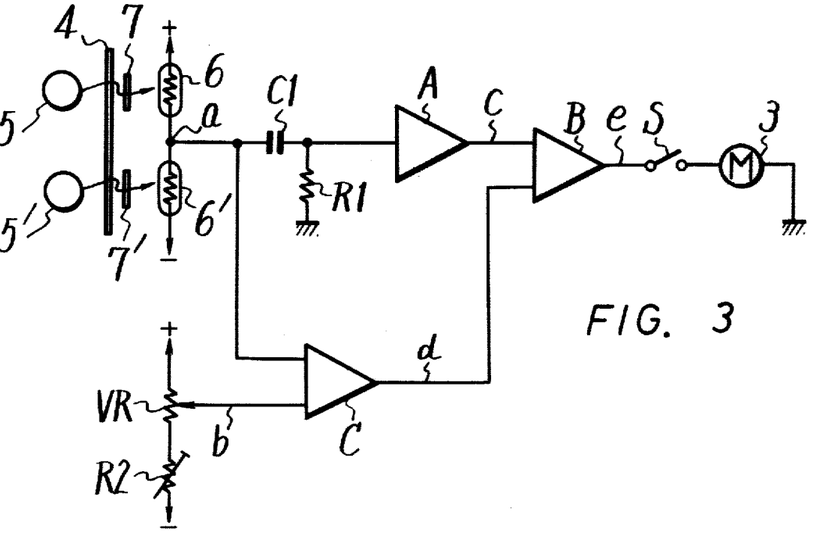
FIG. 3 is a connection diagram of a circuit of the invention used in the apparatus shown in FIG. 1.

In the example of FIG. 3, in order to produce the voltage at the terminal d, a voltage appearing at a movable contact b of a variable resistor VR, across; which is supplied a DC voltage so as to produce a reference voltage for position setting, is applied to one input terminal of comparison amplifier C which is supplied, at its other input terminal, with the voltage at the connection point a. In this case, when the voltages at point a and contact b are equal, the voltage at the output terminal d of the amplifier C becomes zero, while when both the voltages are not equal, the tone arm 1 is rotated under the speed control in the horizontal plane above the record disc with the result that both the voltages at the points a and b become coincident with each other. At this time, as the tone arm 1 approaches near the appointed position, the speed of tone arm 1 becomes low, but as the tone arm 1 is in a position apart from the appointed position, the speed of tone arm 1 is relatively high. Thus, the speed of tone arm 1 is very smooth throughout its movement.

Meantime, when, under such a state that the voltages at the terminals a and b are coincident, and the variable resistor VR is varied under observation of tone arm 1, the tone arm it moves to a position corresponding to the rotary angle set by the variable resistor VR. At this time, since the speed control for the tone arm 1 is carried out, it moves smoothly. In this case, a semi-fixed resistor R2 is connected to the variable resistor VR, and this semi-fixed resistor R2 is so set that when the tone arm 1 is rotated to the outer most position, it corresponds to the outer periphery of a record disc with the diameter of 30 cm. Therefore, the tone arm 1 can be lowered at the outer periphery of the record disc by setting the resistor R2 to its full value even if the tone arm 1 is not observed.

Figure 4:
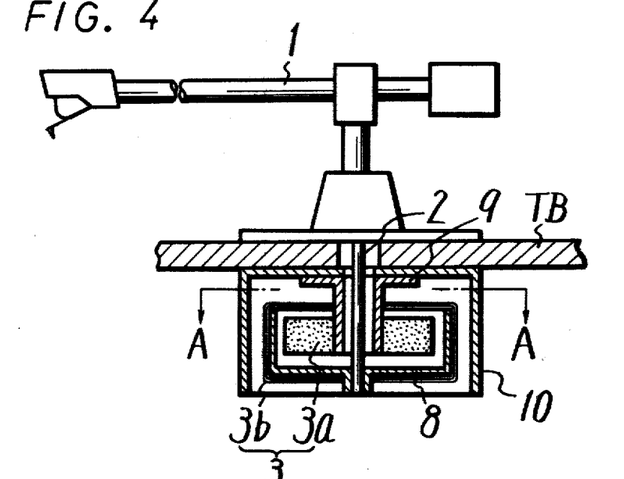
FIG. 4 is a side view, partially cut away, showing mainly the horizontal driving device used in the example shown in FIG. 1.
Figure 5:
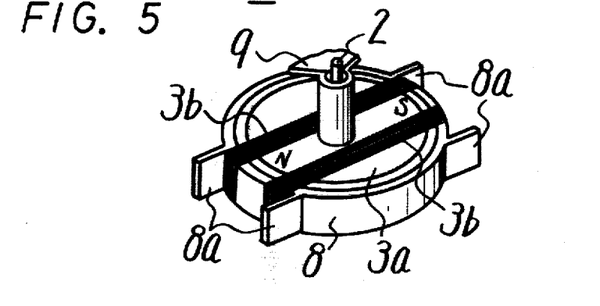
FIG. 5 is a perspective view of the driving portion of the device shown in FIG. 4.
Figure 6:
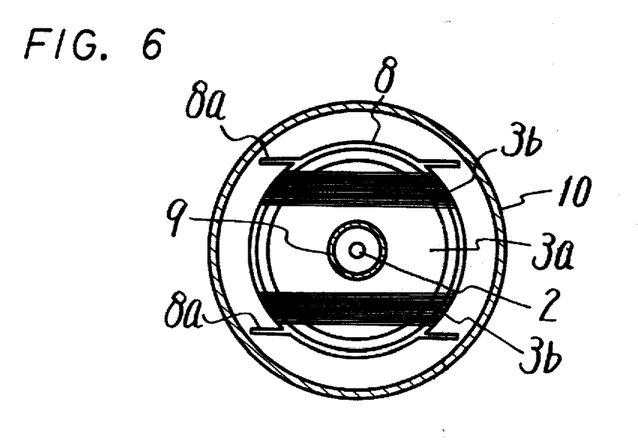
FIG. 6 is a cross-sectional view taken on the line A—A of FIG. 4 and viewed to the arrows.

Turning to FIGS. 4 to 6, a practical example of the drive apparatus 3 will be now described.

As shown in FIG. 4, the rotating shaft 2 of tone arm 1 is extended down through a turn table board TB, and a coil bobbin 8 is attached to the shaft 2 under the board TB. The coil bobbin 8 is made substantially as a cylinder which is preferably provided with projections 8a for the coil 3b to be easily wound thereon as shown in FIG. 5. The magnet 3a is formed as a disc and fixed to a sleeve 9 on the outer periphery thereof through which the shaft 2 passes. This sleeve 9 is fixed to the turn table board TB. Then, the coil bobbin 8 is located to surround the disc magnet 3a. In this case, the coils 3b are wound on the bobbin 8 in parallel with each other, and it is preferred that a substantially cylindrical shield 10 is provided to cover the drive apparatus 3, as shown in FIG. 4.

Figure 7:
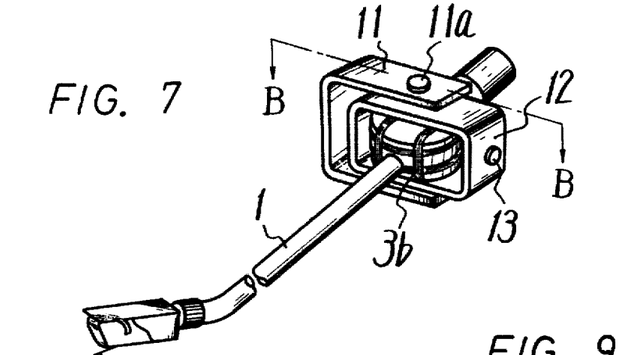
FIG. 7 is a perspective view showing mainly an example of the vertical and horizontal driving devices according to the invention.
Figure 8:
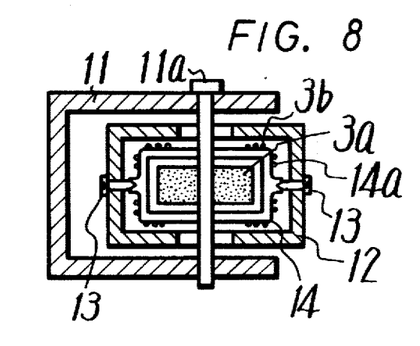
FIG. 8 is a cross-sectional view taken on the line B—B in FIG. 7 and viewed to the arrows.
Figure 9:
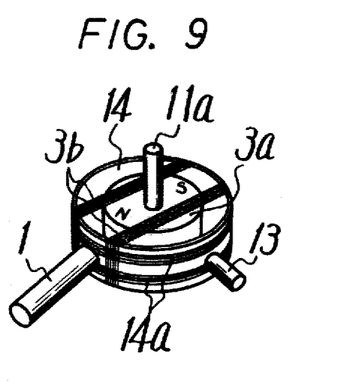
FIG. 9 is a perspective view showing the driving portion of the example shown in FIG. 7.

An example of the apparatus of the invention for driving the tone arm 1 in the vertical and horizontal directions will be described with reference to FIGS. 7 to 9. In this example, a member 11 made of a substantially U-shaped bracket is fixed to a arm base (not shown), and a shaft 11a is attached to the member 11 which shaft 11a passes through the end portions of both legs of member 11. The disc magnet 3a is fixed to the shaft 11a on the portion thereof between both the legs. A horizontal rotary member 12, which is rectangular in cross-section, is rotatably attached to the shaft 11a to surround the disc magnet 3a and to be rotatable in the horizontal plane. Further, a pair of vertical rotary shafts 13 are pivoted to the member 12 to be extended to the inside of the member 12. A coil bobbin 14, on which horizontal drive coils 3b and vertical drive coils 14a are wound as shown in FIG. 9, is pivoted to the free ends of the shafts 13 to be rotatable about the shafts 13.

Figure 10:
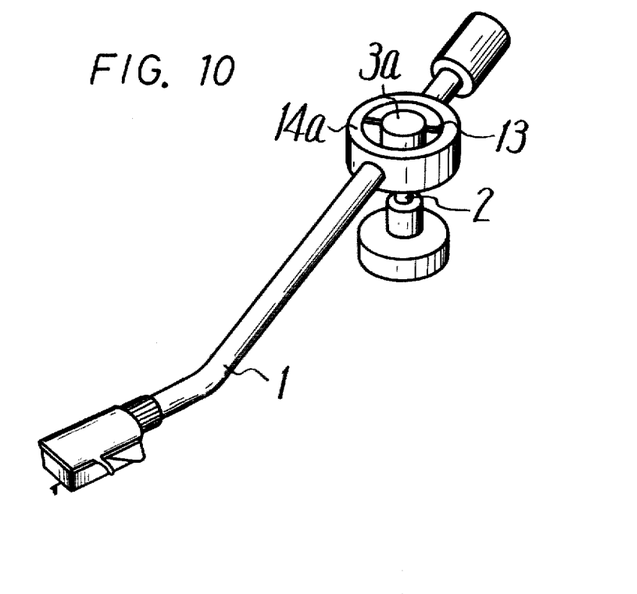
FIG. 10 is a perspective view showing another example of the vertical driving device according to the invention.
Figure 11:
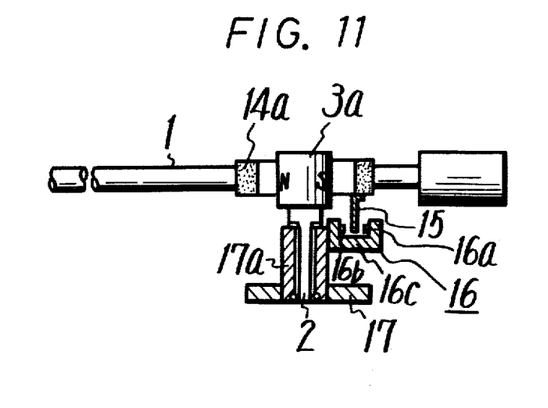
FIG. 11 is a partially cross-sectional view showing the main portion of FIG. 10.

Turning to FIGS. 10 and 11, another example of the drive apparatus of the invention, which drives the tone arm 1 in the vertical plane, will be described. As shown in the figures, in this example, the disc shaped magnet 3a is fixed to the top end of shaft 2 of tone arm 1, and this magnet 3a is magnetized in its diametral direction as shown in FIG. 11. A pair of vertical rotary shafts 13 for the tone arm 1 are attached to the magnet 3a at its diametral direction. The coil 14a, which is wound in a ring-shape in this example and is integrally coupled to the tone arm 1, is pivoted on shafts 13. Thus, the tone arm 1 is always kept horizontal regardless of the horizontal rotating position thereof as shown in FIG. 11. A detector 16 is provided to detect the position of tone arm 1 in the up and down direction. In this example, the detector 16 is formed of a shutter 15 fixed to the tone arm 1 and a pair of a luminous element 16a such as a luminous diode and a light receiving element 16b such as a Cds which are mounted on a fixed member 16c to grip the shutter 15. This member 16c is fixed to a sleeve 17a which is supported by a bearing 17.

With the drive apparatus shown in FIGS. 10 and 11, when the coil 14a is supplied with current, since the magnet 3a is fixed not to be rotated in the vertical direction, a torque is generated to rotate the coil 14a in the vertical direction about the shafts 13 and hence the tone arm 1 can be moved up and down in response to the amount of the current applied to the coil 14a. In this case, the position of shutter 15 between the luminous element 16a and light receiving element 16b is changed and hence the output from the receiving element 16b is changed without applying any side pressure to the bearing 17. The output from the receiving element 16b is proportional to the up- and down-position of tone arm 1, so that if this output is differentiated by a circuit similar to that shown in FIG. 3, the speed signal of tone arm 1 can be obtained to be able to control the tone arm 1.

Figure 12:
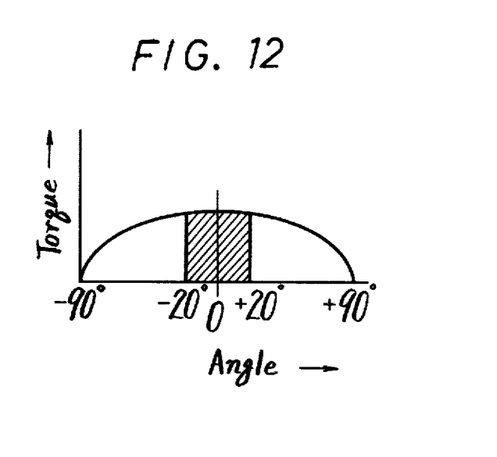
FIG. 12 is a graph used for explaining the torque of the tone arm used in the invention.

Since the magnet 3a used in the tone arm drive apparatus shown in FIGS. 10 and 11 is magnetized in the direction to the center of a rotating range of tone arm 1 and is fixed to the fixed part, the rotating torque is generated in the form of a substantially sinusoidal wave in response to the rotation of tone arm 1 as shown in FIG. 12. However, the rotating angle of tone arm 1 from the periphery of a record disc to the arm rest is about ±20° and, within this rotating angle range shown in FIG. 12 by the hatch, the torque is reduced by about 6% from the maximum torque and hence can be deemed as about flat. Further, as to the up- and down-movement of tone arm 1, it is about several degrees so that there occurs no problem.

According to the above examples of the invention, the drive control for the movements of tone arm 1 in the up- and down-direction, left and right directions and the composite vector direction thereof can be carried out by supplying currents to the respective coils. It is, of course, possible to wind the coils in the direction with the angle of +45° and −45° relative to the horizontal or vertical direction.

In the above examples of the invention, the mass added to the tone arm 1 is only that of coils and, in the example in which the drive apparatus is provided at the rotation center of tone arm 1, the inertial moment of tone arm 1 is increased less and the drive apparatus can be made compact.

Further, in the invention when no current is applied to the coils, no torque or force is applied to the tone arm. Therefore, no special accuracy is required for the respective parts. Also, only the force in the moment direction is applied to the bearing and hence there is caused no unwarrantable matter, so that the tone arm can be driven very smoothly.

Next, a tone arm control apparatus according to the invention for the tone arm 1 with the above horizontal and vertical drive apparatus will be described with reference to FIGS. 13 to 17 in which reference numerals and letters same as those in the foregoing figures designate the same elements or parts.

Figure 13:
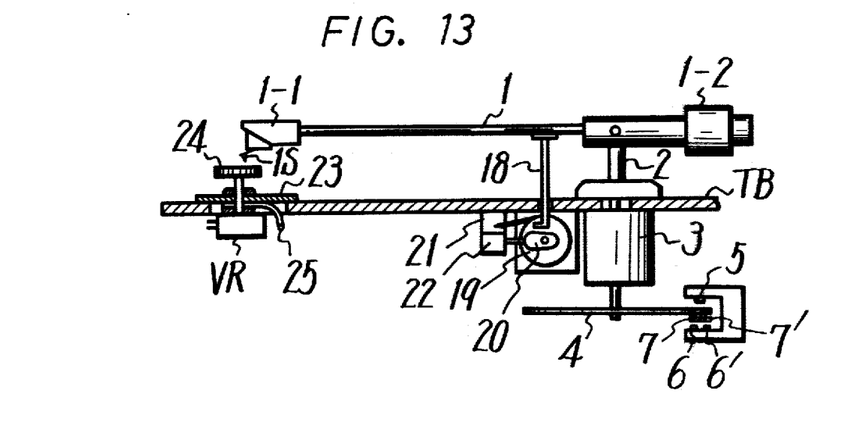
FIG. 13 is a side view, partially in cross-section, showing a tone arm with one example of its driving apparatus according to the invention.
Figure 14:
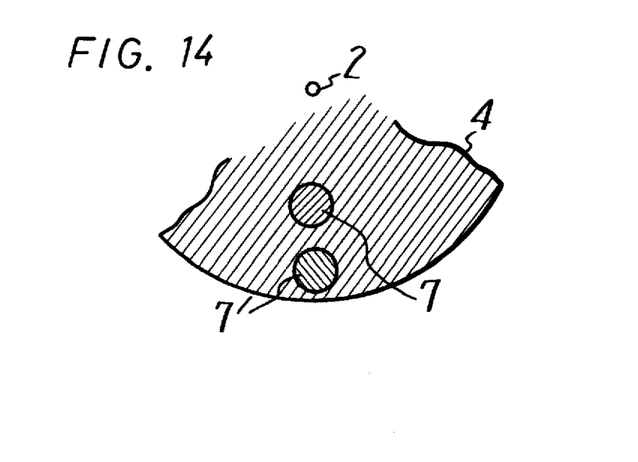
FIG. 14 is a plan view showing a part of a disc which is used in the example shown in FIG. 13 to detect the rotational angle.

As shown in FIG. 13, the tone arm 1 has at its tip end a cartridge 1-1 with a stylus 1S and at its rear end portion a weight 1-2, and the horizontal drive shaft 2 is attached to the tone arm 1 near the weight 1-2. A brushless motor or tone arm horizontal drive apparatus 3 shown in FIGS. 1 to 11 is provided on the shaft 2 so as to drive the tone arm 1 in the horizontal direction. In this example, the polarizing plates 7 and 7' whose polarizing angles are perpendicular to each other as shown in FIG. 14, are also provided between the rotary polarizing disc 4 and the light receiving elements 6, 6' to differentially derive outputs from the elements 6, 6' similar to the foregoing example. The differential output from elements 6, 6' are changed linearily in response to the rotating angle of tone arm 1 as that at the point a in FIG. 3.

Further, an arm lifter 18 for the tone arm 1 is provided which arm lifter is moved up and down by a cam 20 attached to the rotary shaft of a vertical drive apparatus 19 such as a motor or the like. The upper most and lower most movements of arm lifter 18 are detected by switches 21 and 22, respectively.

Figure 15:
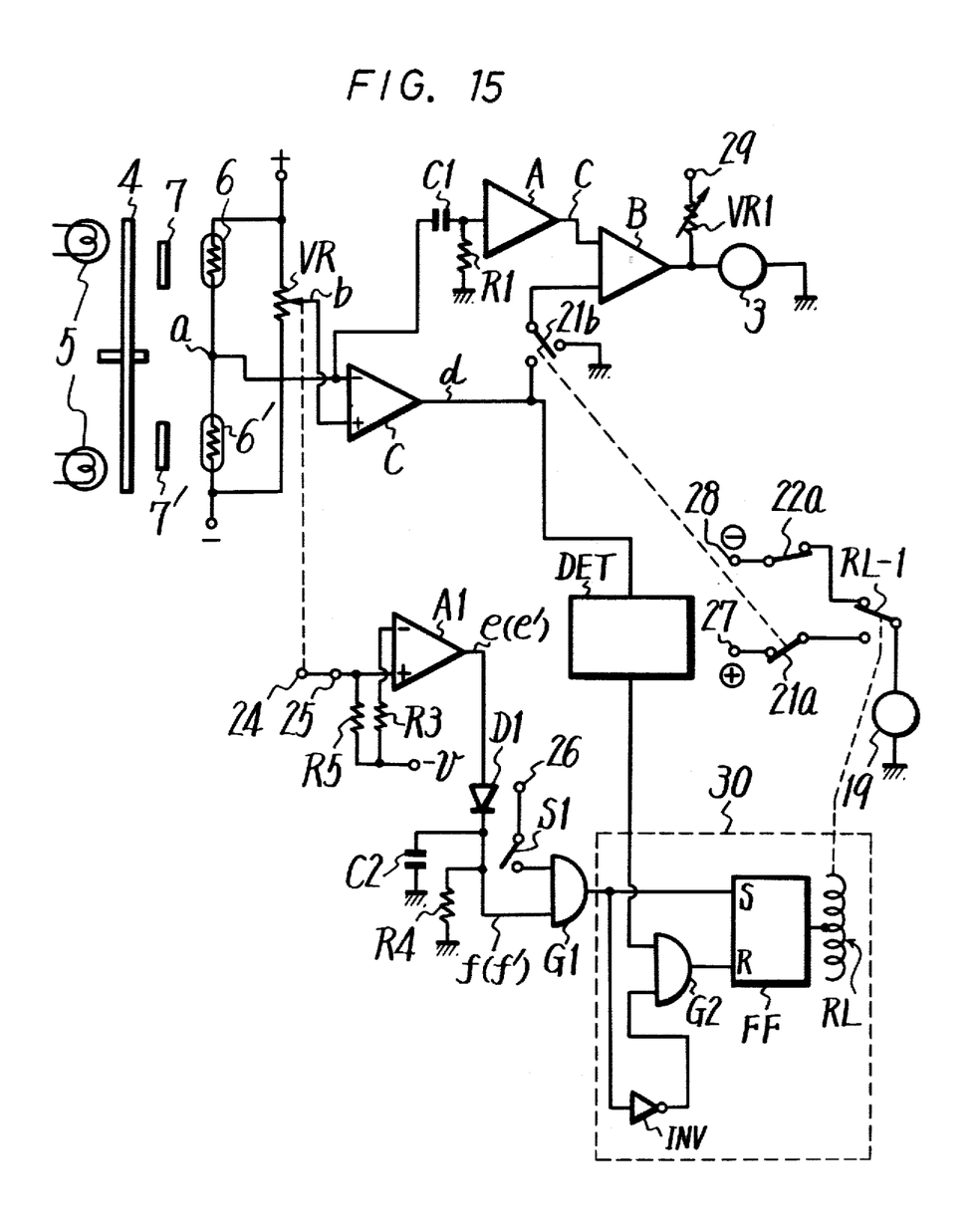
FIG. 15 is a connection diagram of a circuit of the invention used in the example shown in FIG. 13.

As shown in FIG. 15, the light receiving elements 6 and 6' are connected in series, and across the series connection of elements 6 and 6' voltages of $+$ and $-$ are applied. The connection point a between the elements 6 and 6' is connected to the minus $(-)$ input terminal of comparison amplifier C which is connected at its plus $(+)$ input terminal to the movable contact piece b of variable resistor VR which is connected in parallel to the series connection of elements 6 and 6'.

As shown in FIG. 13, the variable resistor VR is adjusted by a knob 24 which is attached to the chassis or turn table board TB of the record player through a non-conductive material 23. This knob 24 is electrically connected through its shaft to a terminal 25.

Turning back to FIG. 15, the output appearing at the point a, which corresponds to the rotary position of tone arm 1, and the output at the contact piece b of variable resistor VR, which determines the set position of tone arm 1, are applied to the comparison amplifier C, so that this amplifier C produces at its output terminal d such an output which corresponds to the difference between the present rotating position of tone arm 1 and the set position thereof. The output at the terminal d is fed through a second contact 21b of switch 21, which is operated by the arm lifter 18 at its upper most position, and differential amplifier B to the horizontal drive apparatus 3 such as the motor to drive the same.

Meantime, in order to provide an output which corresponds to the rotating speed of tone arm 1 (speed control output), the output at the point a, which corresponds to the rotary position of tone arm 1, is differentiated by the differentiation circuit consisting of capacitor C1 and resistor R1, and then this differentiated output is amplified by amplifier A to deliver its output terminal c as the speed control output. This speed control output is applied to one input terminal of differential amplifier B. Thus, the differential amplifier B produce such an output which will reduce the error output applied thereto from the comparison amplifier C. Since the speed control output is controlled by the error output as described above, the speed of tone arm 1 becomes low as it goes near the set position, while the speed of tone arm 1 becomes high as it goes apart from the set position. When the tone arm 1 arrives at the set position, the output at terminal d becomes zero and hence the speed control signal at terminal c becomes zero also. Therefore, the tone arm 1 stops its movement.

Figure 16A:
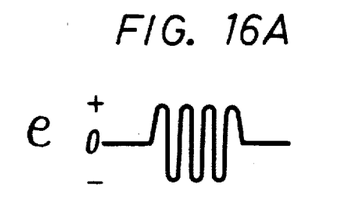
FIGS. 16A, 16B and FIGS. 17A, 17B are waveform diagrams used for explaining the operation of the circuit shown in FIG. 15.
Figure 16B:
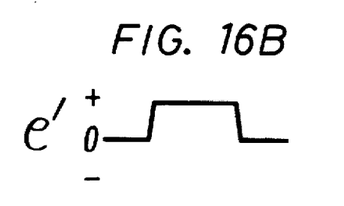
Figure 17A:
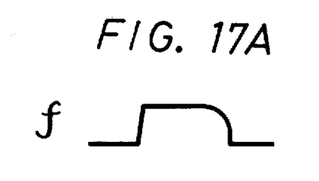
Figure 17B:
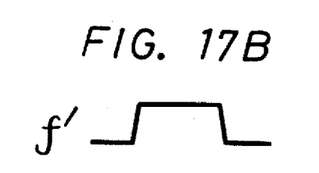

With the invention, as shown in FIG. 15, the terminal 25 is connected to, for example, the plus input terminal $(+)$ of a differential amplifier A1 which is supplied at its minus input terminal $(-)$ with a low voltage $(-v)$ through resistors R3 and R5. Accordingly, when a user touches the knob 24 of variable resistor VR, a signal component such as hum is generated. This hum component e shown in FIG. 16A is amplified by the differential amplifier A1 and delivered to its output terminal. While, in the case that while the knob 24 is touched by the user's one hand the ground (zero volt) is touched by the user's other hand, since the differential amplifier A1 is supplied with a voltage of $-v$ shown in FIG. 16B, the difference voltage between the ground voltage and the voltage of $-v$ is applied to the differential amplifier A1 which produces an output e'. The output voltage e or e' of differential amplifier A1 is applied to the rectifier and smoothing circuit consisting of a diode D1, capacitor C2 and resistor R4 to be a signal f or f' shown in FIG. 17A or 17B which is fed to one input terminal of a gate circuit G1 which is supplied at its other input terminal with a signal, which electrically operates the tone arm 1, through a terminal 26 and a switch S1. When switch S1 is closed, the positioning of tone arm 1 at a desired appointing position is carried out electrically. That is, the tone arm 1 can be electrically located at the desired position by operating the variable resistor VR. While, when the switch S1 is opened, the above operation is not carried out. That is, the tone arm 1 can be operated ordinarily. When the gate circuit G1 is supplied with both the signals or those passed through the switch S1 and indicated by f or f', the gate circuit G1 produces an output and applies the same to a set terminal S of a flip-flop circuit FF to set the latter. Thus, a relay winding RL is energized by the output of flip-flop circuit FF and hence a relay contact RL-1 is closed. Therefore, a vertical drive apparatus 19 such as a motor for driving the arm lifter 18 is supplied with a positive voltage through a terminal 27, a first contact 21a of upper most switch 21 and relay contact RL-1, and hence the arm lifter 18 is raised upwards. When the arm lifter 18 is raised up to its upper most position, the first contact 21a of switch 21 is opened and at the same time its second contact 21b becomes closed. Thus, at this time the error output at the terminal d of comparison amplifier C is fed through the closed contact 21b to the differential amplifier B. Under such a condition, the tone arm 1 is in a free state so that the tone arm 1 can be moved to a desired set position by rotating the knob 24 of variable resistor VR. When the stylus 1S of cartridge 1-1 of tone arm 1 is brought to the desired position, if the user detouches i.e. removes his hand from the knob 24 of variable resistor VR, the difference output at terminal d of comparison amplifier C, which is applied to an error detecting circuit DET for detecting the error output being zero, becomes zero volt. The output from this error detector DET is applied to one input terminal of a second gate circuit G2 which is supplied at its other input terminal with the output of first gate circuit G1 through an inverter INV so that when the user's hand does not touch the knob 24, the gate circuit G2 produces an output which is fed to a reset terminal of flip-flop circuit FF. Accordingly, at this time the flip-flop circuit FF is reset and the relay winding RL is deenergized and the relay contact RL-1 is switched to the other terminal as shown in FIG. 15. At this time, the motor 19 is supplied with a minus voltage through a terminal 28, a contact 22a of lower most switch 22 and relay contact RL-1. Thus, the arm lifter 18 and hence tone arm 1 is lowered with the result that the second contact 21b of upper most switch 21 is made open and the supply of the position control signal to the horizontal drive motor 3 is cut off. At this time, a small amount of current is fed through a terminal 29 and a variable resistor VR1 to the motor 3 to produce such a torque that the tone arm 1 is intended to move the direction opposite to that to the center of the record disc and hence to carry out the inside-force cancelling operation.

Next, in order to move the stylus 1S of cartridge 1-1 of tone arm 1 along the sound groove of the record disc and to start its reproduction, the driving of tone arm 1 in the vertical direction by the vertical drive motor 19 is stopped by the lower switch 22.

The above example of the invention shown in FIGS. 13 to 17 is such a case that when the user detouches his hand from knob 24, the tone arm 1 moves down. However, it is possible that even when the user detouches his hand from knob 24, the tone arm 1 does not move down, but moves down by operating a separate switch.

Further, in the above example of the invention, the operation is started by touching the knob 24. It is also possible that a sleeve is provided coaxial with the variable resistor VR, associated with the knob 24, and the knob and sleeve are moved along the variable resistor VR to be connected to the terminal 25.

Next, such an example of the circuit of the invention in which, during the user's hand being touched to the knob 24, the tone arm 1 does not move down but moves down when it arrives at the set position will be described with reference to FIG. 18.

Figure 18:
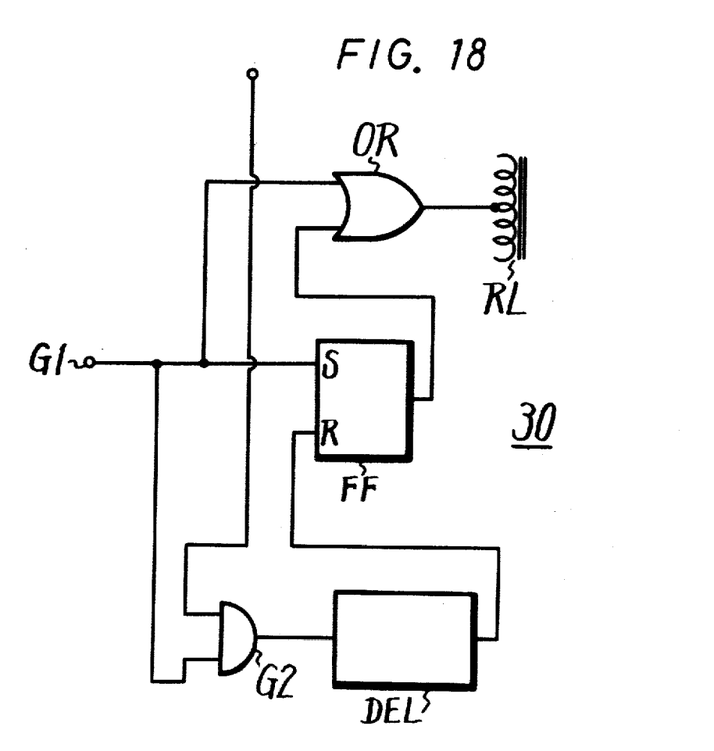
FIG. 18 is a connection diagram showing another example of the dotted line block in FIG. 15.

The connection diagram of FIG. 18 corresponds to the part indicated by a dotted line block 30 in FIG. 15, and the other circuit of this example is substantially same as that of FIG. 15 and hence omitted in FIG. 18.

If the user detouches his hand from the knob 24 of variable resistor VR when the stylus of the tone arm 1 arrives at a desired position, the error voltage at the terminal d of comparison amplifier C, which is fed to the error detector DET, becomes zero. When such the output is produced, if the user's hand is in touch with the knob 24, the outputs from the first gate circuit G1 and the error detector DET through the inverter INV are applied to the second gate circuit G2. Thus, at this time, since the second gate circuit G2 produces an output which is then fed through a delay circuit DEL to the reset terminal R of flip-flop circuit FF, this flip-flop circuit FF is reset. However, during the interval in which the user's hand is in touch with the knob 24, the reset command signal is delivered but the output from an OR-circuit OR, which is supplied with the outputs from the gate circuit G1 and the flip-flop circuit FF, controls the relay winding RL to render the motor 3 capable of being driven in the horizontal direction. Thus, the tone arm 1 can be rotated by operating the knob 24. While, when the user's hand detouches from the knob 24 before the error detector DET, which detects the coincident signal or zero volt signal, delivers an output, the second gate circuit G2 produces no output. Thus, the flip-flop circuit FF is not reset and hence the tone arm 1 is not lowered. Therefore, at the time when the error detector DET delivers the output, and the tone arm 1 is stopped, if the user touches the knob 24 with his hand again or when the tone arm 1 is stopped while the knob 24 is touched with the user's hand, the stylus of tone arm 1 can be positively lowered at the desired position on the record disc.

With the above example of the invention, when the user detaches his hand from the knob 24 after the second gate circuit G2 produces the output, the flip-flop circuit FF is reset and the relay winding RL is deenergized. At this time, the minus voltage is applied from the terminal 28 through the contact 22a of lower most switch 22 of arm lifter 18 and relay contact PL-1 to the vertical drive motor 19, so that the tone arm 1 is lowered and then the second contact 21b of upper most switch 21 is closed or rendered ON with the result that the supply of the position control signal to the horizontal drive motor 3 is cut off.

There is such a case where under good shield effects the induction hum by a human body i.e. AC component does not achieve the above operation by the knob 24 and variable resistor VR, or the AC amplitude is changed dependent upon its placement, and an error operation is caused by the induction click when the sensibility of the detecting means including the amplifiers is raised.

Figure 19A:
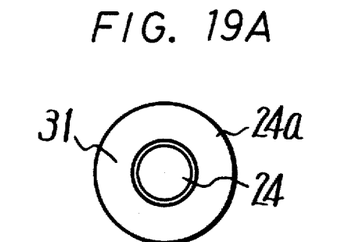
FIGS. 19A and 19B are respectively plan and front views of the operating device shown in FIG. 13.
Figure 19B:
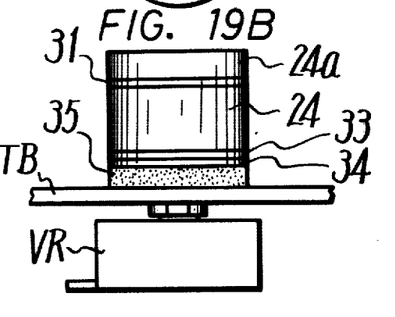
Figure 20:
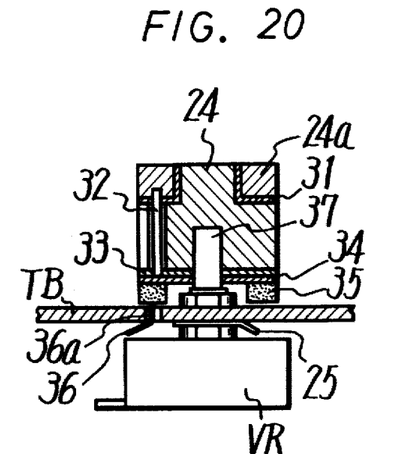
FIG. 20 is a cross-sectional view of FIG. 19B.

With reference to FIGS. 19 and 20, a knob which will avoid the above defect will be described. This knob, having two parts insulated from each other, is so formed that when a user touches the knob, the resistance of the fingers of the user is detected by causing the induction in the insulating member between the two different parts and hence removes the above defect.

In the example shown in FIGS. 19 to 20, the knob 24 is made of conductive material and is formed with a ring-shaped recess on its top periphery. A ring 24a made of conductive material is inserted on the ring-shaped recess within a ring-shaped insulator 31 therebetween and then fixed by a screw 32. This screw 32 also serves to fix a conductor ring 34 to the lower end portion of knob 24 through an insulator ring 33 therebetween.

The variable resistor VR having a lug or output terminal, is attached by its rotary shaft 37 to the knob 24 and to the turn table board or chassis TB made of conductive material a conductive sponge 35 is fixed to the bottom of the knob 24. Also, a lug 36 is provided extending from the conductive sponge 35 through a bore 36a formed in the turntable board TB and electrically insulated from the turntable board TB on the side opposite to the conductive sponge 35.

When a user's hand touches the knob 24 in the embodiment of FIGS. 19 to 20, the following two paths are established. That is, one path is formed from the knob 24 through the rotary shaft 37 to the output terminal 25, and the other path is from the ring 24a through the screw 32, ring 34 and conductive sponge 35 to the lug 36. If the resistance between the lug 36 and terminal 25 is detected by the detector, the resistance component of the user's fingers can be known.

Figures 21A, 21B:
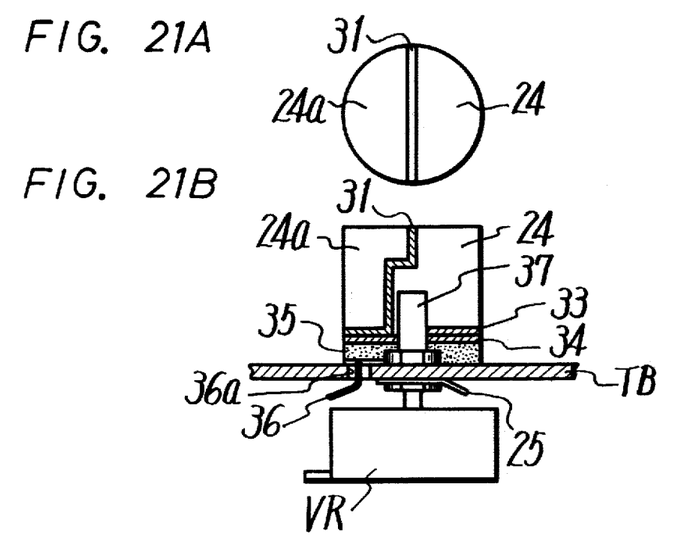
FIGS. 21A and 21B are respectively plan and cross-sectional views showing another example of the operating device according to the invention.

FIGS. 21A and 21B show another example of the knob 24 which is different from that shown in FIGS. 19 and 20 in construction but the same in object.

In the example of FIGS. 21A and 21B, the knob 24 is divided into two substantially same parts along the vertical plane. In this case, the rotary shaft 37 of variable resistor VR is attached to one of the two parts, and the lug 36 is led out from the other part through the conductive ring 34 and conductive sponge 35 so that the resistance of the user's finger between the lug 36 and output terminal 25 can be detected. In FIGS. 21A and 21B, the same references as those used in FIGS. 19 and 20 designate the same elements and hence their detailed description will be omitted.

In the example of FIGS. 21A and 21B, the knob 24 is divided into two parts but it can be divided into more than three parts with the same effect.

Figure 22:
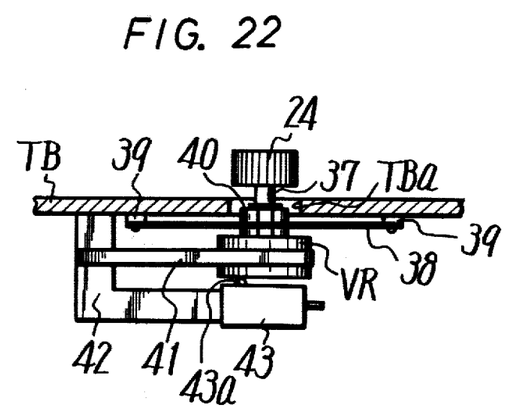
FIG. 22 is a cross-sectional view showing a further example of the operating device of the invention.

A further example of the knob assembly according to the present invention will be now described with reference to FIGS. 22 to 24. In this example, the rotary shaft 37 of variable resistor VR is mounted such that it can be rotated and also movable along its axial direction. A leaf spring 38 is attached at its both ends through collars 39 to the lower surface of chassis or turn table board TB by rivets or the like, as shown in FIG. 22. While, as shown in FIG. 24, the leaf spring 38 has bored therethrough an aperture 38a through which the fixing screw member of variable resistor VR passes, bores 38b through which the above rivets pass, and a plurality of, for example four, slits 38c and 38d for giving a suitable spring force to the leaf spring 38. Then, the fixing screw member of variable resistor VR is inserted into the aperture 38a of leaf spring 38 and then fixed to the leaf spring 38 by a nut 40. In this case, the rotary shaft 37 of variable resistor VR passes through a bore TBa formed through the turn table board TB.

Figure 23:
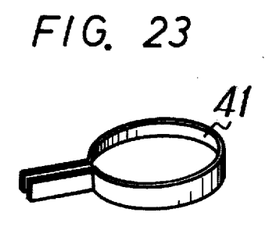
FIG. 23 is a perspective view showing the ring guide used in the example of FIG. 22.
Figure 24:
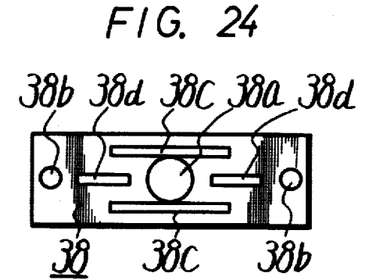
FIG. 24 is a plan view showing a leaf spring used in the example of FIG. 22.

A guide ring 41 shown in FIG. 23 is fitted with its ring-shaped portion around the outer periphery of variable resistor VR and attached at its free end to a substantially L-shaped bracket which is fixed to the lower surface of chassis TB. A switch 43 is fixed to the free end of an L-shaped bracket 42 beneath the variable resistor VR. Then, a knob 24 is fixed to the rotary shaft 37 above the chassis TB.

If the above assembled knob 24 is moved up and down, the variable resistor VR is also moved up and down by the spring force of leaf spring 38 to operate an actuator 43a of switch 43. Thus, if the output from the switch 43 is applied to the drive motor of tone arm 1 (not shown), the tone arm can be moved up and down. In this case, the variable resistor VR can be rotated by rotating the knob 24 as in the ordinary variable resistor.

Figure 25:
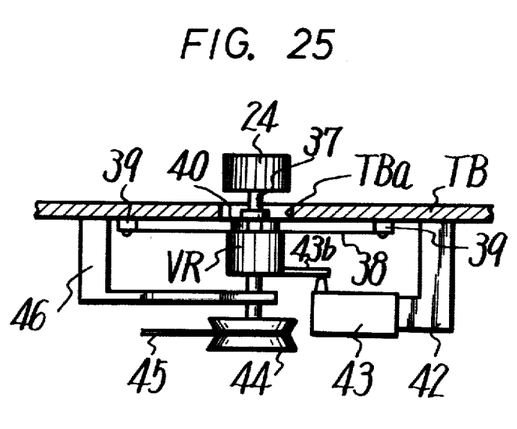
FIG. 25 is a cross-sectional view showing a still further example of the operating device according to the invention.

FIG. 25 shows another example of the knob assembly according to the invention. In this example, the horizontal arm of bracket 42 with the switch 43 is withdrawn from the down position of variable resistor VR, the rotary shaft 37 thereof is extended downwards, a pulley 44 is fixed to the shaft 37 at its extended end, an L-shaped bracket 46 is fixed to the lower surface of chassis TB to rotatably receive the shaft 37 above the pulley 44, and a belt 45 or the like is stretched between the pulley 44 and the rotary shaft of a variable capacitor or the like (not shown). In this case, the actuator of switch 43 is actuated by an arm 43b attach to the variable resistor VR. The other construction of example shown in FIG. 25 is substantially same as that shown in FIGS. 22 to 24.

With the example of FIG. 25, if the knob 24 is rotated, the switch 43 and variable resistor VR are changed simultaneously.

Figure 26:
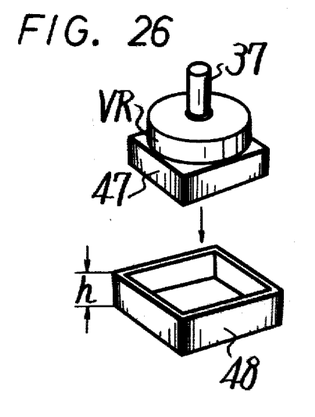
FIG. 26 is a perspective view showing a further example of the operating device of the invention.

FIG. 26 shows a further example of the invention. In this example, a guide member 47, which has a non-circular contour, is attached to the lower end of variable resistor VR, and a guide frame 48, which has a non-circular inner contour, is provided to receive the guide member 47 in such a manner that the guide member 47 can move up and down or in the axial direction of rotary shaft 37 within a height h of the guide frame 48. Thus, the leaf spring 38 used in the examples shown in FIGS. 22 to 24 and FIG. 25 can be omitted in the example of FIG. 26. Though not shown in FIG. 26, the other construction thereof is approximately the same as that of FIG. 22.

According to the present invention constructed as above, without using specific detecting circuits and disturbing the function of the variable resistor, the specific function can be given to the tone arm during the time within which the knob is operated or pushed, and the knob can be used as a starter switch.

According to the invention constructed as above, during the rotation of the tone arm, the vibration generated is greatly diminished, the tone arm can be driven to the set position at a stable speed in a relatively short time even though the load is varied, and also the speed can be changed freely. Further, according to the invention since there is provided no mechanical speed reduction part between the tone arm and its driving apparatus, and there is of no need during the playback to disconnect the tone arm from its horizontal drive apparatus. Hence, during the playback of the record, the horizontal rotating speed of the tone arm is always controlled so that the low frequency band resonance of the cartridge is damped with the result that the reproduction of the record disc is carried out stably with no stylus jump and so on by low noise or the like. Further, if the user touches the knob upon the termination of the playback or on the way of the playback, the tone arm can be automatically turned to its original set position to achieve a repeat playback. While, if the knob is maintained in touch with the user's hand, the tone arm is not lowered. Thus, it is possible that the tone arm can be positioned at a desired position by rotating the variable resistor while watching the stylus of the cartridge. Therefore, even though the stylus pressure of the cartridge is light, the tone arm can be easily operated without the tone arm being dropped to improve the characteristics.

As set forth above, according to the invention, if the user's hand remains in touch with the knob, the tone arm does not lower principally, and even if the user detaches his hand from the knob, the tone arm does not lower until it arrives at the set position. Therefore, although the user detaches his hand from the knob where no record disc exist, the lowering of the tone arm is avoided so that its stylus tip is not damaged. But, the tone arm can be newly brought to the set position.

According to the knob assemblies of the invention shown in FIGS. 19 to 20, different from the other knob assemblies in which the touch condition of the user's hand on the knob is detected by only the human induction hum, the detected value is not changed dependent on the circumferential conditions of the touch state, and the resistance between the portions which are touched by the user's hand is lowered positively by the human body to make the detection positive and to avoid any erroneous operation.

It will be apparent that many modifications and variations could be effected by one skilled in the art without departing from the spirits or scope of the novel concepts of the present invention, so that the scope or spirits of the invention should be determined by the appended claims.

I claim as my invention:

1. A record player comprising:
   (a) a tone arm;
   (b) drive means for selectively moving said tone arm in a horizontal and a vertical direction;
   (c) detecting means for sensing a position of said tone arm in the horizontal direction and producing a voltage corresponding to the position of said tone arm;
   (d) a voltage source having first and second terminals;
   (e) voltage regulating means connected between said first and second terminals of the voltage source for producing a reference voltage corresponding to a desired position, said voltage regulating means having manual operable means for selectively varying said reference voltage;

(f) first comparing means for comparing the voltage from said detecting means with the reference voltage from said voltage regulating means; and (g) speed signal generating means for receiving the voltage from said detecting means and producing a speed signal;

(h) second comparing means for comparing the voltage from said first comparing means with the speed signal and producing a compared signal; and (i) means for applying the compared signal from said second comparing means to said drive means to move said tone arm in said horizontal direction.

2. The record player according to claim 1 including differentiating means connected to an output of said detecting means, said drive means being responsive to the outputs from said differentiating means and comparing means.

3. The record player according to claim 2, in which said means for varying said reference voltage is a variable resistor.

4. The record player according to claim 2, wherein said manually operable means for varying said reference voltage is responsive to the touch of a user to control initiation of said drive means.

5. The record player according to claim 4, including means a DC voltage source connected to an output of said means for varying the reference voltage so as to make said varying means operable even when a user becomes a ground potential.

6. The record player according to claim 4, including means for controlling the operation of said drive means to inhibit downward movement in the vertical direction of said tone arm during the interval when said manually operable means is touched by the user.

7. The record player according to claim 6, wherein said means for controlling the operation of said drive means includes means to cause said tone arm to descend at a predetermined horizontal position when said user detouches said manual operable means.

8. The record player according to claim 3 including a chassis, said variable resistor includes a rotary shaft, means for movably supporting said resistor on said chassis for movement in a direction of the axis of said shaft, spring means fixed to said chassis for resiliently biasing said resistor along the axial direction of said rotary shaft and a switch provided proximte said variable resistor, said switch being actuated in response to axial movement of said variable resistor.

9. The record player according to claim 8, wherein said spring means is a leaf spring.

10. The record player according to claim 8, wherein a pulley is attached to the rotary shaft of said variable resistor, said pulley being associated with a variable capacitor.

11. The record player according to claim 8 including a guide member attached to a lower portion of said variable resistor and a guide frame is attached to said chassis for receiving said guide member permitting said guide member to be movable in the up and down direction.

12. The record player according to claim 8, in which said means for varying the reference voltage includes a first contact portion electrically isolated from the rotary shaft of said varying means and a second contact portion electrically isolated from said first contact portion, said first and second contact portions being capable of being touched by a user simultaneously, the variation of resistance between said first and second contact portions being detected, and applied to control said drive means.

* * * * *